US012612770B2

(12) United States Patent
Yuan et al.

(10) Patent No.: US 12,612,770 B2
(45) Date of Patent: Apr. 28, 2026

(54) WATER SUPPLY SYSTEM, CONTROL METHOD, ELECTRONIC DEVICE, AND STORAGE MEDIUM

(71) Applicant: Shanghai Kohler Electronics, Ltd., Shanghai (CN)

(72) Inventors: Fangsheng Yuan, Shanghai (CN); Lian Xu, Shanghai (CN)

(73) Assignee: Shanghai Kohler Electronics, Ltd., Shanghai (CN)

( * ) Notice: Subject to any disclaimer, the term of this patent is extended or adjusted under 35 U.S.C. 154(b) by 109 days.

(21) Appl. No.: 18/534,046

(22) Filed: Dec. 8, 2023

(65) Prior Publication Data

US 2025/0059734 A1      Feb. 20, 2025

(30) Foreign Application Priority Data

Aug. 15, 2023    (CN) .......................... 202311028525.1

(51) Int. Cl.
| *F16K 31/02* | (2006.01) |
| *E03B 1/04* | (2006.01) |
| *E03C 1/02* | (2006.01) |
| *F16K 31/00* | (2006.01) |

(52) U.S. Cl.
CPC .................. *E03B 1/04* (2013.01); *E03C 1/02* (2013.01); *F16K 31/002* (2013.01); *F16K 31/02* (2013.01)

(58) Field of Classification Search
USPC ................... 137/597, 625.17, 625.4, 625.41; 251/129.04; 236/12.11; 4/676
See application file for complete search history.

(56) References Cited

U.S. PATENT DOCUMENTS

| 3,820,532 A | * | 6/1974 | Eberhardt | ............ | A61C 17/028 |
| | | | | | 601/165 |
| 3,838,516 A | * | 10/1974 | Borochaner | ........... | B01J 47/024 |
| | | | | | 4/263 |
| 4,974,636 A | * | 12/1990 | Cogger | .............. | G05D 23/1393 |
| | | | | | 137/625.17 |
| 6,453,489 B1 | * | 9/2002 | Lee | ........................... | E03C 1/08 |
| | | | | | 4/675 |
| 8,162,236 B2 | * | 4/2012 | Rodenbeck | ........ | G05D 23/1353 |
| | | | | | 239/447 |

(Continued)

FOREIGN PATENT DOCUMENTS

| CN | 201406704 Y | 2/2010 |
| CN | 206670010 U | 11/2017 |

(Continued)

*Primary Examiner* — Matthew W Jellett
(74) *Attorney, Agent, or Firm* — Foley & Lardner LLP

(57)      ABSTRACT

The present disclosure is generally directed towards a water supply system, a control method, an electronic device and a storage medium. The water supply system includes a main faucet, a water outlet accessory receptacle, a main control box, a thermostatic valve, and one or more water outlet accessories. The main control box includes a controller and a water outlet accessory waterway. The water outlet accessory waterway at least includes a heater. One end of the water outlet accessory waterway is communicated with the inlet of the main control box, and the other end of the water outlet accessory waterway is connected with the outlet of the main control box. The controller is connected to the heater and the thermostatic valve respectively.

19 Claims, 5 Drawing Sheets

(56) References Cited

U.S. PATENT DOCUMENTS

| | | | |
|---|---|---|---|
| 8,438,672 B2 * | 5/2013 | Reeder | E03C 1/055 |
| | | | 4/668 |
| 8,516,628 B2 * | 8/2013 | Conroy | E03C 1/05 |
| | | | 4/559 |
| 8,572,772 B2 * | 11/2013 | Wolf | E03C 1/057 |
| | | | 4/678 |
| 9,140,466 B2 | 9/2015 | Jurczyszak et al. | |
| 9,315,976 B2 * | 4/2016 | Rodenbeck | E03C 1/057 |
| 10,064,710 B2 * | 9/2018 | Zhang | A61C 17/0202 |
| 10,087,606 B1 | 10/2018 | Steffenauer | |
| 10,233,621 B2 * | 3/2019 | Park | E03C 1/055 |
| 10,329,748 B2 | 6/2019 | Hall | |
| 10,920,404 B2 * | 2/2021 | Hirsch | H02J 3/14 |
| 10,986,978 B2 | 4/2021 | Morgan | |
| 11,047,119 B2 | 6/2021 | Gallob | |
| 11,189,445 B2 | 11/2021 | Yang et al. | |
| 11,384,518 B2 | 7/2022 | Gibson | |
| 11,448,424 B2 | 9/2022 | Bolognue | |
| 11,584,630 B2 | 2/2023 | Funke | |
| 12,055,958 B2 * | 8/2024 | Wales | G05D 23/1353 |
| 12,077,952 B2 * | 9/2024 | Smith | F16K 37/0058 |
| 2003/0213850 A1 | 11/2003 | Mayer et al. | |
| 2010/0096018 A1 | 4/2010 | Wylie | |
| 2013/0149662 A1 * | 6/2013 | Meloul-Tzubeli | |
| | | | A61C 17/0217 |
| | | | 433/80 |
| 2021/0321829 A1 | 10/2021 | Shell et al. | |
| 2022/0169493 A1 | 6/2022 | Jeon et al. | |
| 2024/0084564 A1 * | 3/2024 | Dueck | E03B 1/04 |

FOREIGN PATENT DOCUMENTS

| | | |
|---|---|---|
| CN | 107461918 A | 12/2017 |
| CN | 109457763 A | 3/2019 |
| CN | 110344470 A | 10/2019 |
| CN | 111576561 A | 8/2020 |
| CN | 111576562 A | 8/2020 |

* cited by examiner

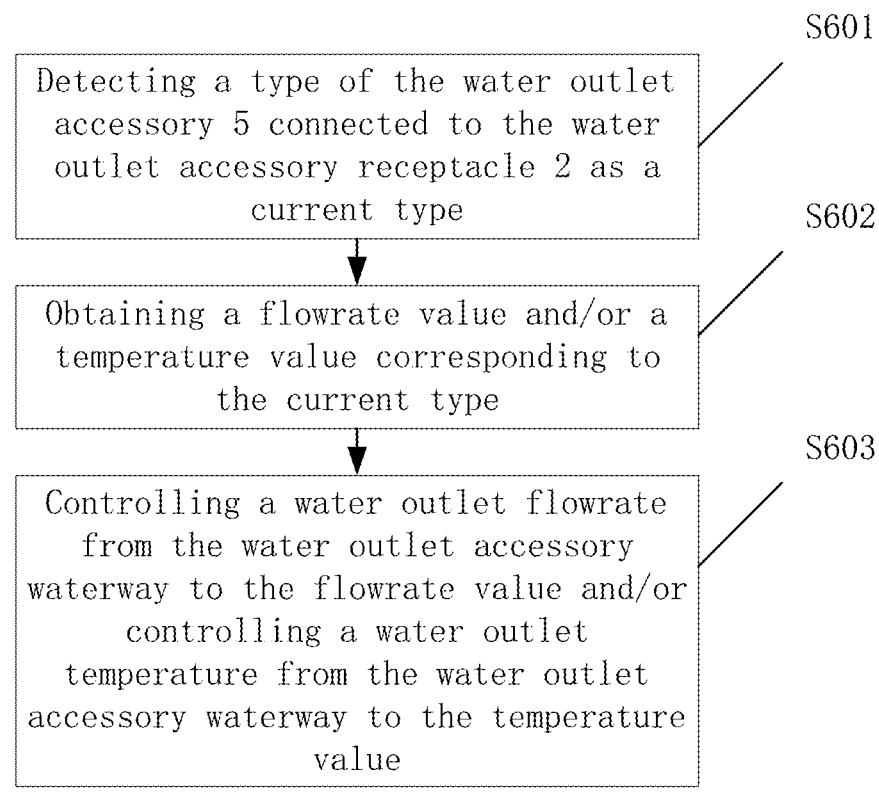

S601

Detecting a type of the water outlet accessory 5 connected to the water outlet accessory receptacle 2 as a current type

S602

Obtaining a flowrate value and/or a temperature value corresponding to the current type

S603

Controlling a water outlet flowrate from the water outlet accessory waterway to the flowrate value and/or controlling a water outlet temperature from the water outlet accessory waterway to the temperature value

FIG. 6

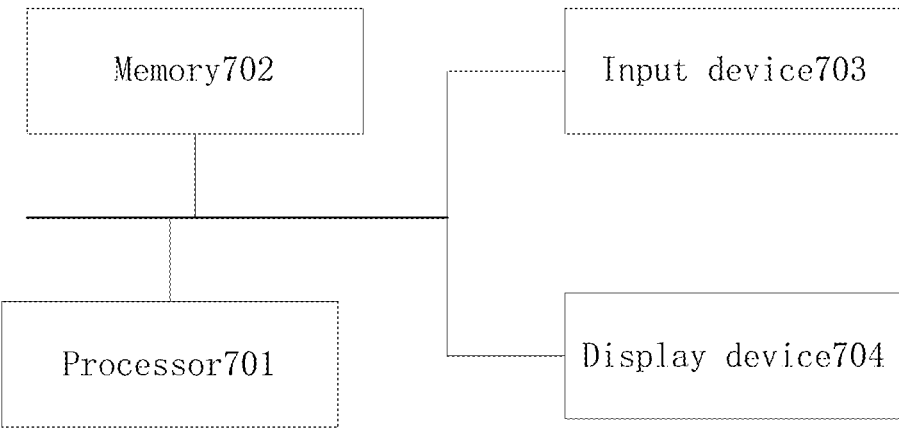

Memory702

Input device703

Processor701

Display device704

FIG. 7

WATER SUPPLY SYSTEM, CONTROL METHOD, ELECTRONIC DEVICE, AND STORAGE MEDIUM

CROSS REFERENCE TO RELATED PATENT APPLICATION

This application claims the benefit of and priority to Chinese Patent Application No. 202311028525.1 filed Aug. 15, 2023, the entire disclosure of which is incorporated by reference herein.

BACKGROUND

The present disclosure relates generally to sanitary devices and more particularly to a water supply system, control method, electronic device, and storage medium.

SUMMARY

One embodiment of the present disclosure relates to a water supply system, including a main faucet, a water outlet accessory receptacle, a main control box, a thermostatic valve, and one or more water outlet accessories. Further, the main faucet is communicated (e.g., fluidly coupled or connected) with an outlet of the thermostatic valve, a cold water inlet of the thermostatic valve is communicated with an external cold water source, a hot water inlet of the thermostatic valve is communicated with an external hot water source, the water outlet accessory receptacle is communicated with an outlet of the main control box, an inlet of the main control box is communicated with the external cold water source, and the water outlet accessory receptacle is detachably connected with the water outlet accessory receptacle. Further, the main control box includes a controller and a water outlet accessory waterway, the water outlet accessory waterway at least includes a heater, one end of the water outlet accessory waterway is communicated with the inlet of the main control box, a different end of the water outlet accessory waterway is communicated with the outlet of the main control box, and the controller is connected with the heater and the thermostatic valve respectively.

In some embodiments, the water outlet accessory waterway further includes a water inlet solenoid valve, a flowmeter, and a distributor, and wherein the controller is connected with the water inlet solenoid valve, the flowmeter, and the distributor respectively.

In some embodiments, the water inlet solenoid valve, the flowmeter, the heater, and the distributor are communicated to form the water outlet accessory waterway.

In some embodiments, the water inlet solenoid valve is communicated with the inlet of the main control box, and wherein the distributor is communicated with the outlet of the main control box.

In some embodiments, the main control box further includes a pressure relief valve communicated with the water inlet solenoid valve, and the controller is connected with the pressure relief valve.

In some embodiments, the main control box further includes a pressure sensor communicated with the distributor, the controller is connected with the pressure sensor.

In some embodiments, the water outlet accessory receptacle includes a dental water jet, a facial cleanser, and a sprayer.

In some embodiments, the controller is configured to detect a type of water outlet accessory receptacle connected to the water outlet accessory receptacle as a current type.

In some embodiments, the controller is further configured to obtain a flowrate value or a temperature value corresponding to the current type.

In some embodiments, the controller is further configured to control a water outlet flowrate of the water outlet accessory waterway to the flowrate value or controlling a water outlet temperature of the water outlet accessory waterway to the temperature value.

One embodiment of the present disclosure relates to a method of a water supply system. The method includes detecting, by a controller of the water supply system, a type of water outlet accessory receptacle connected to a water outlet accessory receptacle as a current type. The method further includes obtaining, by the controller, a flowrate value or a temperature value corresponding to the current type. The method further includes controlling, by the controller, a water outlet flowrate of a water outlet accessory waterway to the flowrate value or controlling a water outlet temperature of the water outlet accessory waterway to the temperature value.

In some embodiments, the water outlet accessory waterway further includes a water inlet solenoid valve, a flowmeter, and a distributor.

In some embodiments, the controller is connected with the water inlet solenoid valve, the flowmeter, and the distributor respectively, and wherein the water inlet solenoid valve, the flowmeter, a heater, and the distributor are communicated to form the water outlet accessory waterway.

In some embodiments, the method further includes detecting a flowrate detected value of the flowmeter and determining the type of water outlet accessory receptacle connected with the water outlet accessory receptacle as the current type, according to the flowrate detected value.

In some embodiments, obtaining the flowrate value or the temperature value corresponding to the current type further includes obtaining a flowrate value preset by a user corresponding to the current type or obtaining a temperature value preset by the user corresponding to the current type.

One embodiment of the present disclosure relates to an electronic device. The electronic device includes at least one processor, a memory connected to the at least one processor, wherein the memory stores instructions executable by the at least one processor, the instructions are executed by the at least one processor to enable the at least one processor to detect a type of water outlet accessory receptacle connected to a water outlet accessory receptacle as a current type. The instructions are executed by the at least one processor to enable the at least one processor further to obtain a flowrate value or a temperature value corresponding to the current type. The instructions are executed by the at least one processor to enable the at least one processor further to control a water outlet flowrate of a water outlet accessory waterway to the flowrate value or controlling a water outlet temperature of the water outlet accessory waterway to the temperature value.

In some embodiments, the water outlet accessory waterway further includes a water inlet solenoid valve, a flowmeter, and a distributor.

In some embodiments, the at least one processor is connected with the water inlet solenoid valve, the flowmeter, and the distributor respectively, and wherein the water inlet solenoid valve, the flowmeter, a heater, and the distributor are communicated to form the water outlet accessory waterway.

In some embodiments, the instructions are executed by the at least one processor to enable the at least one processor further to detect a flowrate detected value of the flowmeter and determine the type of water outlet accessory receptacle connected with the water outlet accessory receptacle as the current type, according to the flowrate detected value.

In some embodiments, the obtaining the flowrate value or the temperature value corresponding to the current type further includes obtaining a flowrate value preset by a user corresponding to the current type or obtaining a temperature value preset by the user corresponding to the current type.

BRIEF DESCRIPTION OF THE DRAWINGS

FIG. 6 is a workflow diagram of a control method of an embodiment of the present disclosure.

FIG. 7 is a schematic diagram of the hardware structure of an electronic device of the present disclosure.

DETAILED DESCRIPTION

Figure 1:
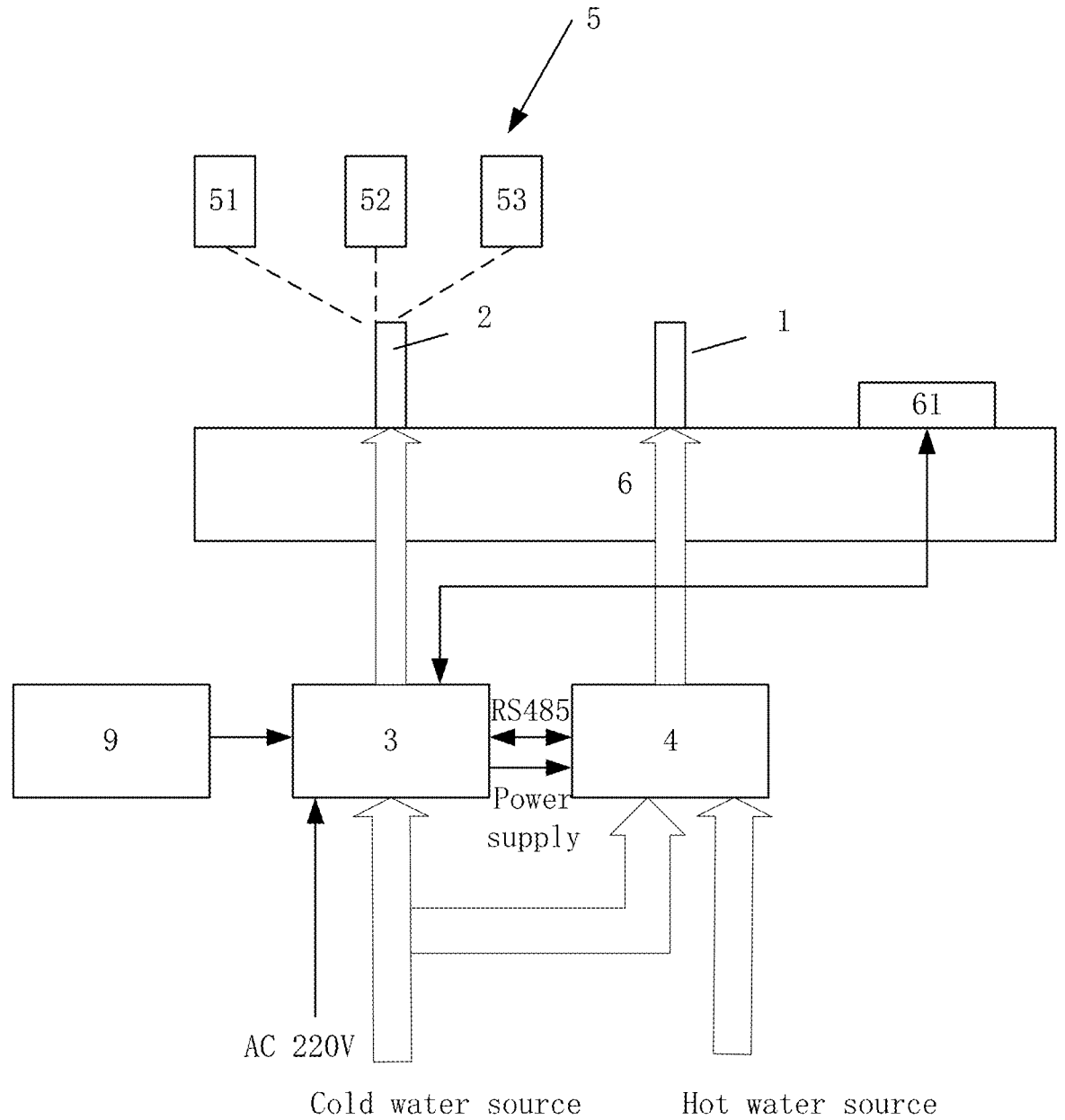
FIG. 1 is a system schematic diagram of a water supply system of the present disclosure.

Referring generally to the FIGURES, the present disclosure addresses the technical problem of being unable to provide hot water for a low flowrate outlet accessory. A water supply system, a control method, an electronic device, and a storage medium addressing this technical problem are described herein.

The present disclosure provides a water supply system, including a main faucet, a water outlet accessory receptacle, a main control box, a thermostatic valve and one or more water outlet accessories, wherein the main faucet is communicated (e.g., fluidly coupled or connected) with an outlet of the thermostatic valve, a cold water inlet of the thermostatic valve is communicated with an external cold water source, a hot water inlet of the thermostatic valve is communicated with an external hot water source, the water outlet accessory receptacle is communicated with an outlet of the main control box, an inlet of the main control box is communicated with the external cold water source, the water outlet accessory receptacle is detachably connected with the water outlet accessory.

In some embodiments, the main control box includes a controller and a water outlet accessory waterway, the water outlet accessory waterway at least includes a heater, one end of the water outlet accessory waterway is communicated with the inlet of the main control box, and the other end is communicated with the outlet of the main control box, and the controller is connected with the heater and the thermostatic valve respectively.

Further, the water outlet accessory waterway further includes a water inlet solenoid valve, a flowmeter, and a distributor, the controller is connected with the water inlet solenoid valve, the flowmeter, and the distributor, respectively, and the water inlet solenoid valve, the flowmeter, the heater, and the distributor are communicated to form the water outlet accessory waterway, and the water inlet solenoid valve is communicated with the inlet of the main control box, and the distributor is communicated with the outlet of the main control box.

Furthermore, the main control box further includes a pressure relief valve communicated with the water inlet solenoid valve, and the controller is connected with the pressure relief valve. Furthermore, the main control box further includes a pressure sensor communicated with the distributor, the controller is connected with the pressure sensor. Further, the water outlet accessory includes a dental water jet, a facial cleanser and a sprayer.

In some embodiments, the present disclosure provides a control method of the aforesaid water supply system including detecting a type of the water outlet accessory connected to the water outlet accessory receptacle as a current type, obtaining a flowrate value and/or a temperature value corresponding to the current type, and controlling a water outlet flowrate of the water outlet accessory waterway to the flowrate value and/or controlling a water outlet temperature of the water outlet accessory waterway to the temperature value.

Further, the water outlet accessory waterway further includes a water inlet solenoid valve, a flowmeter, and a distributor, the controller is connected with the water inlet solenoid valve, the flowmeter, and the distributor respectively, and the water inlet solenoid valve, the flowmeter, the heater, and the distributor are communicated to form the water outlet accessory waterway, detecting the type of the water outlet accessory connected with the water outlet accessory receptacle as the current type, specifically includes detecting a flowrate detected value of the flowmeter and determining the type of the water outlet accessory connected with the water outlet accessory receptacle as the current type, according to the flowrate detected value.

Further, obtaining the flowrate value and/or the temperature value corresponding to the current type, specifically includes obtaining a flowrate value preset by a user corresponding to the current type and/or obtaining a temperature value preset by the user corresponding to the current type.

In some embodiments, the present disclosure provides an electronic device including at least one processor and a memory connected to the at least one processor, wherein the memory stores instructions executable by the at least one processor, the instructions are executed by the at least one processor to enable the at least one processor to perform the control method as previously described.

The present disclosure provides a storage medium, the storage medium storing a computer instruction for performing all steps of the control method as previously described when a computer executes the computer instructions.

The present disclosure separates the waterway of the main faucet from the waterway of the water outlet accessory, the main faucet is connected with an external cold water source and the external hot water source through the thermostatic valve, so that hot water can be obtained through the gas water heater, while the water outlet accessory waterway is separately and additionally equipped with a heater, and the heater is controlled by the controller to heat, so as to meet the heating needs of low-flowrate water accessories, saving water and enhancing the user experience.

The existing water outlet accessories used for washing in the washroom, such as oral irrigator, etc., mostly adopt a tap water tank structure or cannot integrate cleaning function with water supply. For this purpose, the existing technology proposed to combine the water accessory with the main faucet, after the temperature and flowrate of the mixed hot and cold water are adjusted by the mechanical handle, the water is output to a filter cartridge, the filtered water is discharged through the main faucet, and an outlet nozzle of the main faucet is made into a form that is easy to disassemble, users can switch the water outlet accessory to a facial cleanser or an oral irrigator according to their needs.

The water supply of the main faucet includes cold water supply and hot water supply. The flowrate of the main faucet is about 5 L/min. Generally, the start-up flowrate of a gas water heater requires to reach about 2 L/min. Therefore, the hot water supply of the main faucet is generally provided by a household gas water heater.

However, some of the water outlet accessories have a very low flowrate, the oral irrigator has a flowrate of about 0.5 L/min and the facial cleanser has a flowrate of about 1 L/min, therefore small flowrate water outlet accessories are not able to get hot water through a gas water heater. If hot water needs to be obtained, the usage flowrate of the water outlet accessory needs to be increased, but high flowrate accessory will reduce the user's experience.

The specific embodiments of the present disclosure will be further described with reference to the drawings hereinafter. Same parts are denoted by same reference numerals. It should be noted that the terms "front," "back," "left," "right," "up," and "down" used in the following description refer to the directions in the drawings, and the terms "inner" and "outer" refer to the directions towards or far away from geometric centers of specific parts respectively.

As shown in FIG. 1 is a system schematic diagram of a water supply system of the present disclosure including a main faucet 1, a water outlet accessory receptacle 2, a main control box 3, a thermostatic valve 4 and one or more water outlet accessories 5, wherein the main faucet 1 is communicated (e.g., fluidly coupled or connected) with an outlet of the thermostatic valve 4, a cold water inlet of the thermostatic valve 4 is communicated with an external cold water source, a hot water inlet of the thermostatic valve 4 is communicated with an external hot water source, the water outlet accessory receptacle 2 is communicated with a an outlet of the main control box 3, an inlet of the main control box 3 is communicated with the external cold water source, the water outlet accessory receptacle 2 is detachably connected with the water outlet accessory 5.

The main control box 3 includes a controller 31 and a water outlet accessory waterway, the water outlet accessory waterway at least includes a heater 32, one end of the water outlet accessory waterway is communicated with the inlet of the main control box 3, and the other end is communicated with the outlet of the main control box 3, and the controller 31 is connected with the heater 32 and the thermostatic valve 4, respectively.

Specifically, as shown in FIG. 1, the embodiment includes two waterways, one waterway is a main waterway with the thermostatic valve 4 controlling a water outlet flowrate and temperature of the main faucet 1. Preferably, the thermostatic valve 4 is a digital water mixing valve. The main faucet 1 has a large water flowrate, therefore the hot water can be obtained regardless of which hot water supply method is used in the household, so only the thermostatic valve 4 is employed to control its ratio of cold water to hot water to obtain different flowrates and temperatures required by the user, and the user can also be able to control the water supply flowrate and the water supply temperature from the main faucet with one button through a UI interface of a UI controller 61 on the base 6.

The other waterway of water supply has a small flow rate, and therefore, in order to meet its demand, this embodiment employs the way of instantaneous heater to provide hot water for it, and the controller 31 and various assemblies of the water outlet accessory waterway are embedded in the main control box 3, and the assemblies of the water outlet accessory waterway at least include the heater 32. After the user plugs the water outlet accessory 5 into the water outlet accessory receptacle 2, the user can control the water supply flowrate and the water supply temperature of the water outlet accessory receptacle 2 with one button through the UI interface of the UI controller 61, and the hot water is realized to be ready for use instantly.

Figure 2:
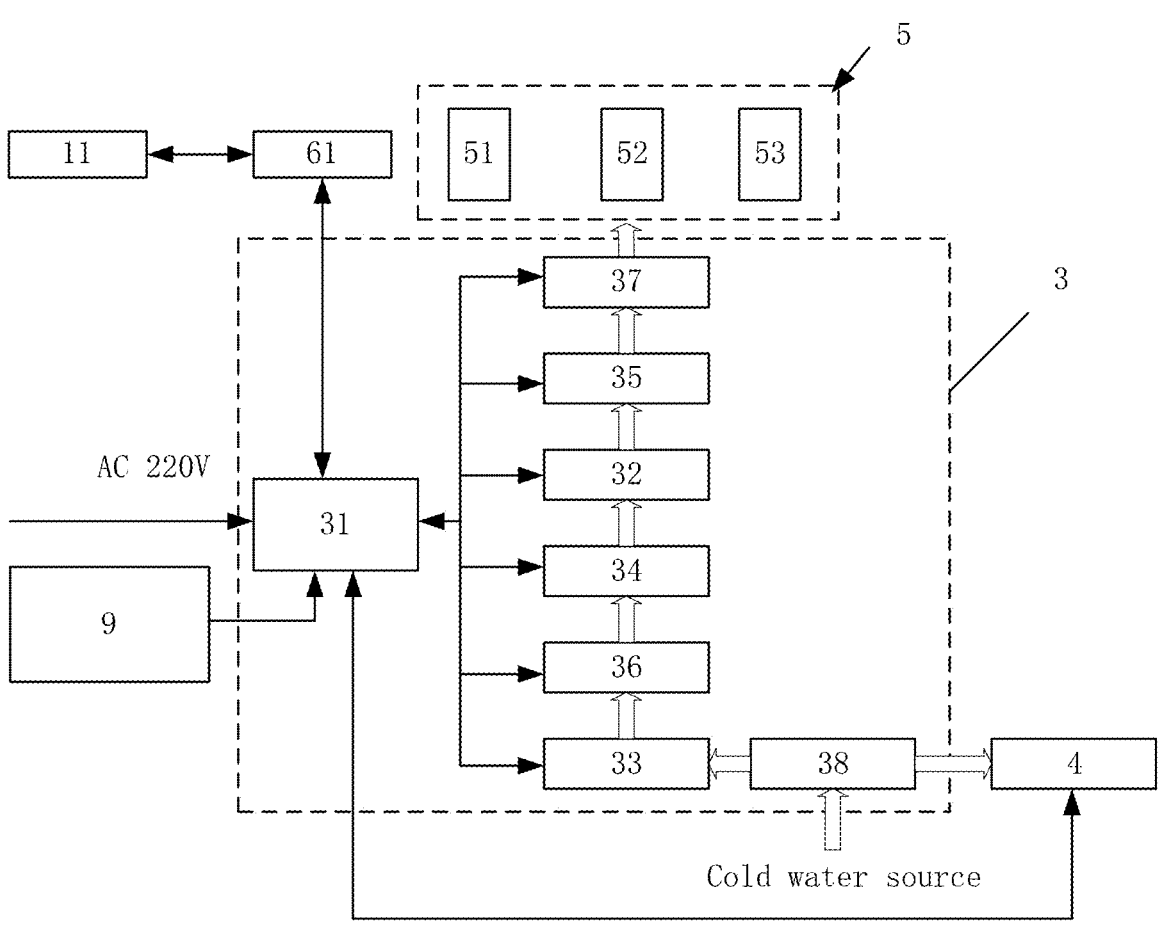
FIG. 2 is a schematic diagram of a main control box of the water supply system of an embodiment of the present disclosure.

FIG. 2 is an internal structure diagram of the main control box 3 of the water supply system of an embodiment of the present disclosure. Wherein, the controller 31 is connected with the heater 32 and the thermostatic valve 4. The controller 31 can receive control signals input by a user through the UI interface of the UI controller 61. Then, the controller 31 controls on or off the heater 32, or the controller 31 communicates with the thermostatic valve 4 to obtain the temperature of the thermostatic valve 4 and controls the valve opening of the thermostatic valve 4 to control a ratio of cold water to hot water.

Figure 3:
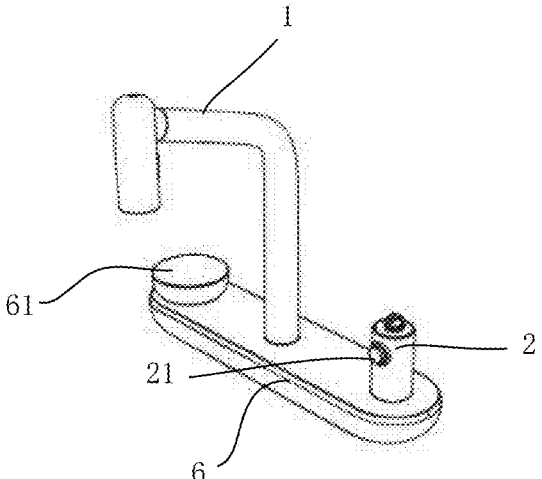
FIG. 3 is an appearance schematic diagram of a main faucet and a water outlet accessory receptacle integrated on a base of the best embodiment of the present disclosure.

As shown in FIG. 3 is an appearance schematic diagram of a main faucet and a water outlet accessory receptacle integrated on a base of the best embodiment of the present disclosure, wherein the main faucet 1 and the outlet accessory receptacle 2 are fixed to the base 6.

The present disclosure separates the waterway of the main faucet from the waterway of the water outlet accessory, the main faucet is connected with an external cold water source and the external hot water source through the thermostatic valve, so that hot water can be obtained through the gas water heater, while the water outlet accessory waterway is separately and additionally equipped with a heater, and the heater is controlled by the controller to heat, so as to meet the heating needs of low-flowrate water accessories, saving water and enhancing the user experience.

As shown in FIG. 1 to FIG. 5, another embodiment of the present disclosure provides a water supply system, including a main faucet 1, a water outlet accessory receptacle 2, a main control box 3, a thermostatic valve 4 and one or more water outlet accessories 5, wherein the main faucet 1 is communicated with an outlet of the thermostatic valve 4, a cold water inlet of the thermostatic valve 4 is communicated with an external cold water source, a hot water inlet of the thermostatic valve 4 is communicated with an external hot water source, the water outlet accessory receptacle 2 is communicated with an outlet of the main control box 3, an inlet of the main control box 3 is communicated with the external cold water source, the water outlet accessory receptacle 2 is detachably connected with the water outlet accessory 5.

The main control box 3 includes a controller 31 and a water outlet accessory waterway, the water outlet accessory waterway includes a heater 32, a water inlet solenoid valve 33, a flowmeter 34, a distributor 35, a pressure relief valve 36, and a pressure sensor 37, one end of the water outlet accessory waterway is communicated with the inlet of the main control box 3, and the other end is communicated with the outlet of the main control box 3, and the controller 31 is connected with the heater 32 and the thermostatic valve 4, the controller 31 is connected with the water inlet solenoid valve 33, the pressure relief valve 36, the flowmeter 34, the heater 32, the distributor 35, and the pressure sensor 37, respectively, and the water inlet solenoid valve 33, the pressure relief valve 36, the flowmeter 34, the heater 32, the distributor 35, and the pressure sensor 37 are communicated to form the water outlet accessory waterway, and the water inlet solenoid valve 33 is communicated with the inlet of the main control box 3, and the distributor 35 is communicated with the outlet of the main control box 3, and the water outlet accessory 5 includes a dental water jet 51, a facial cleanser 52, and a sprayer 53.

Specifically, the main control box 3 includes the controller 31, the heater 32, the water inlet solenoid valve 33, the flowmeter 34, the distributor 35, the pressure relief valve 36, and the pressure sensor 37. Wherein the controller 31 is an electronic device for controlling the heater 32, the water inlet solenoid valve 33, the flowmeter 34, the distributor 35, the pressure relief valve 36, the pressure sensor 37, and the thermostatic valve 4.

The controller 31 can receive information from the UI controller 61 to set the flowrate and temperature in different modes that user prefers.

The controller 31 detects the flowrate of the water outlet accessory waterway according to the flowmeter 34. The flowmeter 34 may also contains a thermometer assembly. The heater 32 heats the water outlet accessory waterway according to the control of the controller 31 to control the water outlet temperature. The heater 32 is preferably an instantaneous heater and contains a thermometer. The distributor 35 is used to regulate the flowrate of the water outlet accessory waterway. The pressure relief valve 36 depressurizes the water entering the water outlet accessory waterway to avoid excessive water pressure of the municipal cold water delivered by the external cold water source 7. The water outlet accessory receptacle 2 is provided with an accessory button 21 to control the water to flow out or stop flowing out. The pressure sensor 37 is situated in a main control box water outlet 39 for detecting the water pressure of the accessory waterway, the controller 31 detects the pressure output from the pressure sensor 37 to determine whether the user presses the accessory button 21. When the user presses the accessory button 21, the accessory waterway discharges water and the water pressure of the accessory waterway decreases, then the controller 31 controls the water inlet solenoid valve 33 to inflow, and when the user stops pressing the accessory button 21, the accessory waterway stops discharging water and the water pressure of the accessory waterway increases, then the controller 31 controls the water inlet solenoid valve 33 to stop inflowing.

Users can set the working mode of the system to a faucet mode, tooth washing mode, face washing mode, and water mist mode through the UI of UI controller 61. And the flow of water and temperature in different modes can be set according to personal preferences. In the faucet mode, the user can send control information to the controller 31 through the UI or a human body sensing sensor 11 to control the thermostatic valve 4 to provide water for the main faucet 1. Other modes use instant heating without pre-draining, and the water outlet is hot instantly after use. The main control box 3 has a pressure stabilizer and a pressure relief device inside.

Wherein, as shown in FIG. 1, the municipal-supplied cold water as cold water source is divided into 2 waterways; one waterway is to the main control box 3, the main control box 3 heats the water and regulates the flowrate then outputs the water to the water outlet accessory 5. The water outlet accessory 5 includes dental water jet 51, facial cleanser 52, sprayer 53 and other accessories; the other waterway of cold water is input to the thermostatic valve 4 together with the customer's hot water system (as the hot water source), and then output to the main faucet 1 after the temperature and flow are regulated by the thermostatic valve 4.

The whole system is divided into two parts, on-countertop part and under-countertop part. The on-countertop part mainly includes the main faucet 1 and the water outlet accessory receptacle 2 mounted on the base 6. The water outlet accessory receptacle 2 can be plugged with various water outlet accessories 5. A UI controller 61 including a UI and a human body sensing sensor 11 and other components can also be mounted on the base 6; the under-countertop part mainly includes a main control box 3 and a thermostatic valve 4. The system inputs utility power to the main control box 3, the main control box 3 provides power for the UI controller 61, the human body sensing sensor 11, thermostatic valve 4, during the utility power outage, the user can choose to use the external battery pack 9 as an emergency power supply. Wherein, the facial cleanser 52, sprayer 53 are rechargeable, powered by lithium batteries, users can charge them by themselves.

Figure 4:
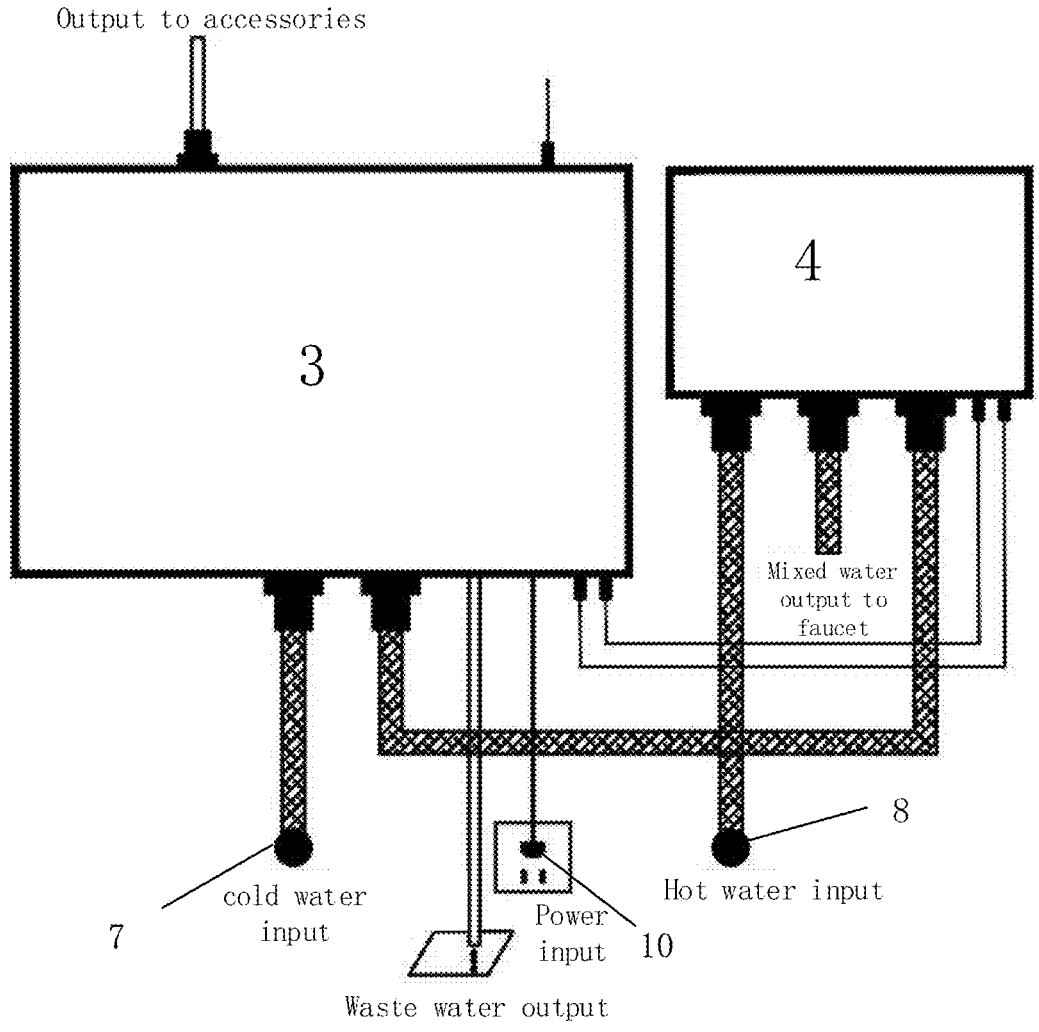
FIG. 4 is a connection schematic diagram of the water supply system of an embodiment of the present disclosure.
Figure 5:
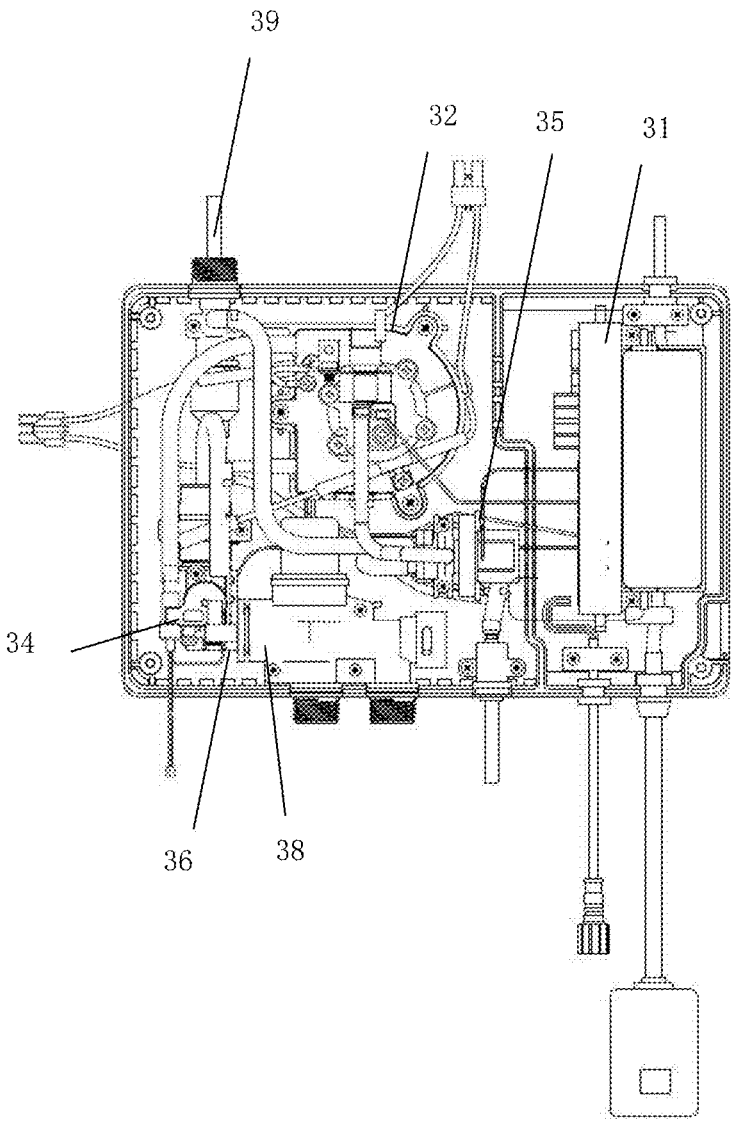
FIG. 5 is an internal structure diagram of the main control box of the water supply system of an embodiment of the present disclosure.

In faucet mode, as shown in FIGS. 4 and 5, the external cold water source 7 and external hot water source 8 are input to the thermostatic valve 4, the external cold water source 7 is the municipal cold water, and the municipal cold water enters the thermostatic valve 4 through the three-way valve 38, and the external hot water source 8 is from the gas water heater, and it enters directly into the thermostatic valve 4. The user can set the preferred flowrate and temperature through the remoter or the UI controller 61, and the controller 31 of the main control box 3 receives the setting information from the remoter or the UI controller 61, and sends command to the thermostatic valve 4 through the RS485 bus to control the user's water flowrate and temperature; the user can also trigger on and off of the thermostatic valve 4 through the human body sensing sensor 11, and when the human body sensing sensor 11 detects that someone is close to it, it sends an information to the UI controller 61, which transmits information about the proximity of the human body to the main control box 3, and the controller 31 sends a command to activate the thermostatic valve 4, thereby controlling the main faucet 1 to discharge water with the water temperature and flowrate of a preset default value.

In dental water jet/cleanser/sprayer mode, the user selects the dental water jet mode, inserts the dental water jet 51 into the water outlet accessory receptacle 2, and the controller 31 of the main control box 3 controls and opens the water inlet solenoid valve 33, wherein the water inlet solenoid valve 33 is located inside the three-way valve 38, and the municipal cold water from the external cold water source 7 is inputted into the instantaneous heater 32 through the three-way valve 38, the water inlet solenoid valve 33, the pressure relief valve 36 and the flowmeter 34, and the distributor 35 automatically adjusts the flowrate to 0.5 L/min, and the controller 31 of the main control box 3 automatically controls the power of the instantaneous heater 32 according to the current flowrate and the difference value between the water inlet temperature and water outlet temperature, in order to control the water outlet temperature to meet the user's requirements. The facial cleanser 52 and the sprayer 53 work on the same working principle as the dental water jet 51.

For each water dispensing accessory 5, such as the dental water jet 51, the facial cleanser 52, and the sprayer 53, due to the different internal pipeline structures, difference water outlet flowrate and pressure value are obtained when the distributor 35 is opened at a fixed position. The controller 31 of the main control box 3 can automatically identify the user mode, and at the same time, if the value of the pressure sensor is abnormal, it can automatically adjust the water shunt valve or prompt the user for the fault type.

As an example, the UI controller 61 is a UI controller containing five buttons, [Faucet], [Dental Water Jet], [Facial Cleanser], [Sprayer] and [Flowrate]. The UI controller 61 includes an OLED screen, which can display the temperature and flowrate values, and in addition, the UI controller 61 is able to rotate for adjusting the temperature and flowrate; when the user uses the [Faucet], [Dental Water Jet], [Facial Cleanser], the user can preset the preferred temperature and flowrate through the UI controller 61; and in addition, the system is set up with a variety of protection functions, such as overheating and overvoltage.

This embodiment can make bathroom water use more intelligent and convenient, and the user can control the water outlet temperature and water outlet flowrate adjustment of the water-used devices with one button in a human-computer interaction manner. In addition, when the user uses the water outlet accessory, hot water can be obtained instantly after turning on the water outlet accessory by using the heater, which not only enhances the customer's use experience, but also saves water resources. In addition, the appropriate flowrate and temperature of the accessory enhance the user's sense of use.

As shown in FIG. 6, it is a workflow diagram of a control method of a water supply system as previously described of an embodiment of the present invention. In step S601, detecting a type of the water outlet accessory 5 connected to the water outlet accessory receptacle 2 as a current type. In step S602, obtaining a flowrate value and/or a temperature value corresponding to the current type. In step S603, controlling a water outlet flowrate of the water outlet accessory waterway to the flowrate value and/or controlling a water outlet temperature of the water outlet accessory waterway to the temperature value. Specifically, this embodiment can be applied to the controller 31 of the main control box 3 of the water supply system as described previously.

Firstly, step S601 is performed to determine the type of the water outlet accessory 5 as the current type after the user has connected the water outlet accessory 5 to the water outlet accessory receptacle 2.

In one of the embodiments, the water outlet accessory waterway further includes a water inlet solenoid valve 33, a flowmeter 34, and a distributor 35, the controller 31 is connected with the water inlet solenoid valve 33, the flowmeter 34, and the distributor 35, respectively, and the water inlet solenoid valve 33, the flowmeter 34, the heater 32, and the distributor 35 are communicated to form the water outlet accessory waterway. Detecting the type of the water outlet accessory 5 connected with the water outlet accessory receptacle 2 as the current type, specifically includes detecting a flowrate detected value of the flowmeter 34 and determining the type of the water outlet accessory 5 connected with the water outlet accessory receptacle 2 as the current type, according to the flowrate detected value.

Specifically, the type of the water outlet accessory may be determined from the flowrate detected value of the flowmeter 34. Since different water outlet accessories 5 have different water outlet areas, the flowrate detected by the flowmeter 34 is different when different water outlet accessories 5 are connected to the water outlet accessory receptacle 2. Thereby, the type of water outlet accessory 5 used by the user can be automatically identified according to the flowrate value of the flowmeter 34.

This embodiment automatically identifies the type of water outlet accessory used by the user through the flowrate value of the water outlet accessory waterway, which is more intelligent.

Then step S602 is performed to obtain the flowrate value and/or temperature value corresponding to the current type. Specifically, the flowrate value and/or temperature value is associated to each type of water outlet accessories 5. The flowrate value and/or temperature value associated with the current type is then obtained when performing step S602.

In one of the embodiments, obtaining the flowrate value and/or the temperature value corresponding to the current type, specifically includes obtaining a flowrate value preset by a user corresponding to the current type and/or obtaining a temperature value preset by the user corresponding to the current type.

In this embodiment, user can set personal preferred flowrate values and/or temperature values for different water outlet accessories in advance, so that the user's preferred flowrate values and/or temperature values can be used directly to meet the user's needs after the current type is automatically identified. For different water outlet accessories, the user can set only the flowrate value, only the temperature value, and set both the flowrate value and the temperature value.

Finally, then step S603 is performed to control the water outlet flowrate and/or the water outlet temperature of the water outlet accessory waterway according to the obtained flowrate value and/or temperature value.

The present disclosure selects different water outlet methods by detecting the type of the water outlet accessories so as to meet the needs of different water outlet accessories, and to enhance the user's sense of use through the appropriate flowrate and temperature of the accessory.

As shown in FIG. 7, a schematic diagram of the hardware structure of an electronic device of the present disclosure includes at least one processor 701 and a memory 702 connected to the at least one processor 701. In some embodiments, the memory 702 stores instructions executable by the at least one processor, the instructions are executed by the at least one processor to enable the at least one processor to perform the control method of the water supply system as previously described.

An example of one processor 701 is shown in FIG. 7. An electronic device is preferably the controller 31 of the main control box 3 of the water supply system as described previously. The electronic device may also include an input device 703 and a display device 704. The processor 701, the memory 702, the input device 703, and the display device 704 may be connected via a bus or other means, and the connection via a bus is shown as an example. The memory 702, as a non-volatile computer readable storage medium, can be used to store non-volatile software programs, non-volatile computer executable programs, and modules, such as the program instructions/modules corresponding to the control method in this embodiment, for example, the method flow shown in FIG. 6. The processor 701 executes various functional applications and data processing by running the non-volatile software programs, instructions, and modules stored in the memory 702, i.e., realizing the control method in the above embodiment.

The memory 702 may include a stored program area and a stored data area, wherein the stored program area may store the operating system, at least one the application program required by function; and the stored data area may store data created based on the use of the control method, etc. In addition, the memory 702 may include high-speed random access memory, and may also include non-volatile memory, such as at least one disk memory device, flash memory device, or other non-volatile solid state memory device. In some embodiments, memory 702 optionally include memory that is remotely located relative to processor 701, and these remote memories may be connected via a network to a device that performs a control method.

Examples of the networks includes, but are not limited to, the Internet, corporate intranets, local area networks, mobile networks, and its combinations thereof.

The input device 703 may receive input user clicks and generate a signal input related to user settings as well as function control of the control method. Display device 704 may include a display apparatus such as a display screen.

The one or more modules are stored in the memory 702, and execute the control method of any of the method embodiments described above when run by the one or more processors 701.

The application selects different water outlet methods by detecting the type of the water outlet accessories so as to meet the needs of different water outlet accessories, and to enhance the user's sense of use through the appropriate flowrate and temperature of the accessory.

One embodiment of the application provides a storage medium, the storage medium storing computer instructions for performing all steps of the control method as previously described when a computer executes the computer instructions.

The above described embodiments only express several embodiments of the present disclosure, and their descriptions are more specific and detailed, but they are not to be understood as a limitation of the patent scope of the present disclosure. It should be pointed out that, for those of ordinary skills in the art, several other modifications and improvements may be made without deviating from the principle of the present disclosure, which should also be regarded as falling in the protection scope of the present disclosure. Therefore, the scope of protection of the patent of the present invention shall be subject to the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members, or the two members and any additional intermediate members being integrally formed as a single unitary body with one another or with the two members or the two members and any additional intermediate members being attached to one another.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the debris-reducing drain insert as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Other substitutions, modifications, changes, and omissions may also be made in the design, operating conditions, and arrangement of the various exemplary embodiments without departing from the scope of the present invention. For example, any element (e.g., cutting blade, cutting plate, cover, impeller, support structure etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A water supply system, comprising:
   a main faucet;
   a water outlet accessory receptacle;
   a main control box;
   a thermostatic valve; and
   a water outlet accessory comprising an accessory button operable to control water to flow out or stop flowing out of the water outlet accessory;
   wherein the main faucet is communicated with an outlet of the thermostatic valve, a cold water inlet of the thermostatic valve is communicated with an external cold water source, a hot water inlet of the thermostatic valve is communicated with an external hot water source, the water outlet accessory receptacle is communicated with an outlet of the main control box, an inlet of the main control box is communicated with the external cold water source, and the water outlet accessory is detachably connected with the water outlet accessory receptacle; and wherein the main control box comprises a controller, a water outlet accessory waterway, and a pressure sensor configured to detect a water pressure of the water outlet accessory waterway, the water outlet accessory waterway at least comprises a heater, one end of the water outlet accessory waterway is communicated with the inlet of the main control box, a different end of the water outlet accessory waterway is communicated with the outlet of the main control box, and the controller is connected with the heater and the thermostatic valve respectively, and the controller is configured to determine when the accessory button is pressed based on the water pressure detected by the pressure sensor and control a flow of the water in the water outlet accessory waterway based on whether the accessory button is pressed.

2. The water supply system of claim 1, wherein the water outlet accessory waterway further comprises a water inlet solenoid valve, a flowmeter, and a distributor; and wherein the controller is connected with the water inlet solenoid valve, the flowmeter, and the distributor respectively.

3. The water supply system of claim 2, wherein the water inlet solenoid valve, the flowmeter, the heater, and the distributor are communicated to form the water outlet accessory waterway.

4. The water supply system of claim 2, wherein the water inlet solenoid valve is communicated with the inlet of the main control box; and wherein the distributor is communicated with the outlet of the main control box.

5. The water supply system of claim 2, wherein the pressure sensor is communicated with the distributor; and wherein the controller is connected with the pressure sensor.

6. The water supply system of claim 1, wherein the water outlet accessory receptacle comprises a dental water jet, a facial cleanser, and a sprayer.

7. The water supply system of claim 1, wherein the controller is configured to detect a type of water outlet accessory connected to the water outlet accessory receptacle as a current type.

8. The water supply system of claim 7, wherein the controller is further configured to obtain a flowrate value or a temperature value corresponding to the current type.

9. The water supply system of claim 8, wherein the controller is further configured to:

control a water outlet flowrate of the water outlet accessory waterway to the flowrate value; or control a water outlet temperature of the water outlet accessory waterway to the temperature value.

10. A method for controlling a water supply system, comprising:

detecting, by a controller of the water supply system, a type of water outlet accessory connected to a water outlet accessory receptacle as a current type;

obtaining, by the controller, a flowrate value or a temperature value corresponding to the current type;

controlling, by the controller, a water outlet flowrate of a water outlet accessory waterway to the flowrate value or controlling a water outlet temperature of the water outlet accessory waterway to the temperature value;

receiving, by the controller, a water pressure of the water outlet accessory waterway detected by a pressure sensor;

determining, by the controller, when an accessory button is pressed based on the water pressure detected by the pressure sensor, the accessory button operable to control water to flow out or stop flowing out of the water outlet accessory; and controlling, by the controller, a flow of the water in the water outlet accessory waterway based on whether the accessory button is pressed.

11. The method of claim 10, wherein the water outlet accessory waterway further comprises a water inlet solenoid valve, a flowmeter, and a distributor.

12. The method of claim 11, wherein the controller is connected with the water inlet solenoid valve, the flowmeter, and the distributor respectively; and wherein the water inlet solenoid valve, the flowmeter, a heater, and the distributor are communicated to form the water outlet accessory waterway.

13. The method of claim 11, further comprising:

detecting a flowrate detected value of the flowmeter; and determining the type of water outlet accessory connected with the water outlet accessory receptacle as the current type, according to the flowrate detected value.

14. The method of claim 10, wherein obtaining the flowrate value or the temperature value corresponding to the current type further comprises:

obtaining a flowrate value preset by a user corresponding to the current type; or obtaining a temperature value preset by the user corresponding to the current type.

15. An electronic device, comprising:

at least one processor; and a memory connected to the at least one processor;

wherein the memory stores instructions executable by the at least one processor, the instructions are executed by the at least one processor to enable the at least one processor to:

detect a type of water outlet accessory connected to a water outlet accessory receptacle as a current type;

obtain a flowrate value or a temperature value corresponding to the current type;

control a water outlet flowrate of a water outlet accessory waterway to the flowrate value or control a water outlet temperature of the water outlet accessory waterway to the temperature value;

receive a water pressure of the water outlet accessory waterway detected by a pressure sensor;

determine when an accessory button is actuated based on the water pressure detected by the pressure sensor, the accessory button operable to control water to flow out or stop flowing out of the water outlet accessory; and control a flow of the water in the water outlet accessory waterway based on whether the accessory button is actuated.

16. The electronic device of claim 15, wherein the water outlet accessory waterway further comprises a water inlet solenoid valve, a flowmeter, and a distributor.

17. The electronic device of claim 16, wherein the at least one processor is connected with the water inlet solenoid valve, the flowmeter, and the distributor respectively; and wherein the water inlet solenoid valve, the flowmeter, a heater, and the distributor are communicated to form the water outlet accessory waterway.

18. The electronic device of claim 17, wherein the instructions are executed by the at least one processor to enable the at least one processor further to:

detect a flowrate detected value of the flowmeter; and determine the type of water outlet accessory receptacle connected with the water outlet accessory receptacle as the current type, according to the flowrate detected value.

19. The electronic device of claim 15, wherein obtaining the flowrate value or the temperature value corresponding to the current type further comprises:

obtaining a flowrate value preset by a user corresponding to the current type; or obtaining a temperature value preset by the user corresponding to the current type.

* * * * *